Patented June 5, 1923.

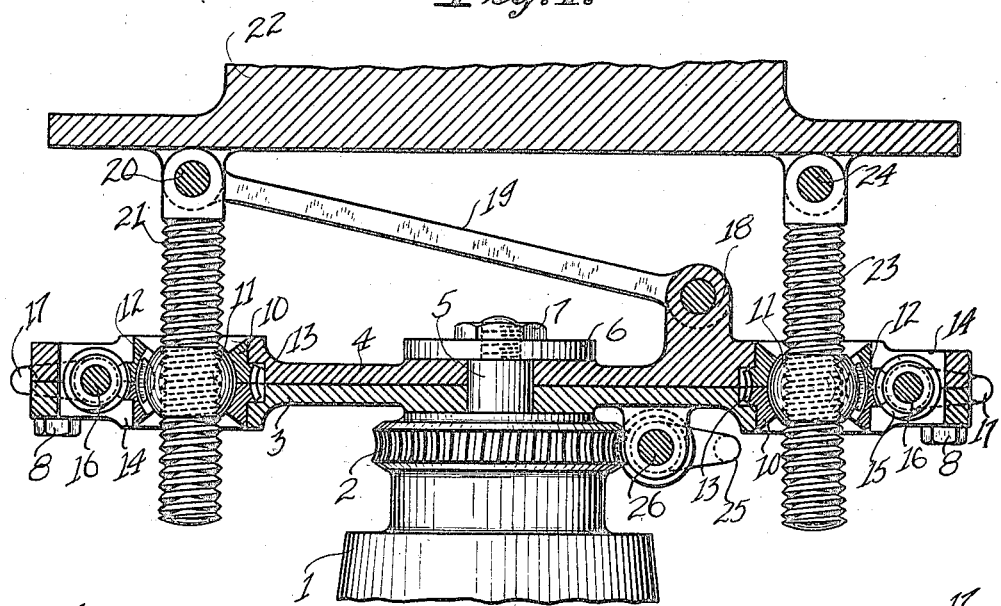
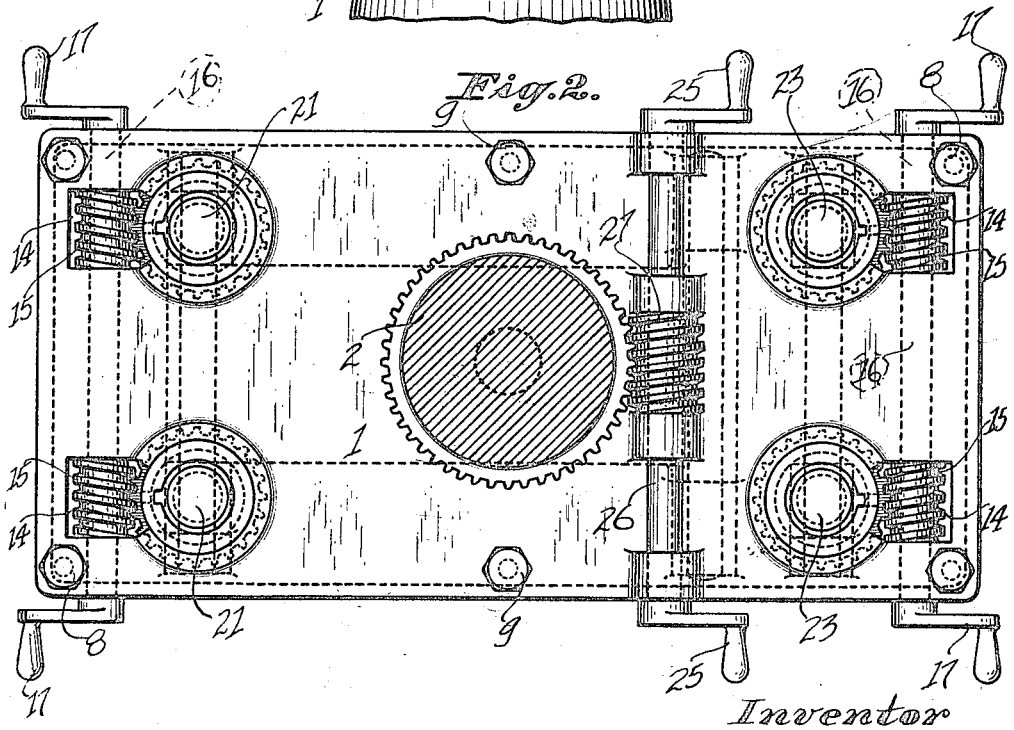

1,457,982

UNITED STATES PATENT OFFICE.

DAVE MAKOWER, OF SAN FRANCISCO, CALIFORNIA.

CAMERA SUPPORT.

Application filed January 7, 1922. Serial No. 527,733.

*To all whom it may concern:*

Be it known that I, DAVE MAKOWER, a citizen of the United States, residing at San Francisco, in the county of San Francisco, and State of California, have invented new and useful Improvements in Camera Supports, of which the following is a specification.

My invention relates to an improved adjustable support and has for its object the provision of means for obtaining an accurate adjustment in both a horizontal and vertical plane of an object such as a camera, a piece of work or anything else that must be positioned in a certain horizontal or vertical plane for a particular purpose.

A further object of this invention is to provide a device of the character described which is simple in construction, economical to manufacture and highly efficient in use.

Other objects and advantages will be apparent during the course of the following description.

In the accompanying drawings forming a part of this specification, and in which like numerals are employed to designate like parts throughout the same, Fig. 1 is a vertical section of my support, and Fig. 2 is a bottom plan view.

In the accompanying drawings wherein for the purpose of illustration is shown a preferred embodiment of my invention, the numeral 1 represents a pedestal, tripod head or the like on which is fixedly mounted a gear 2. Rotatably mounted thereon is a plate 3. A top plate 4 is mounted on the plate 3 and has the same contour as the plate 3. These plates are to rotate on the reduced end 5 of the pedestal with the washer 6 and nut 7 holding the same thereon. The top and bottom plates are clamped together at their four corners by the bolts 8 and along the side by the bolts 9. Each plate is made with two spaced apart openings at their respective ends made to receive the bearings 10 for the internally threaded ball members 11. The latter having tongues 12 seated in slots in the bearings to limit the oscillating movement of the members in but one direction in the bearings as well as to prevent rotation of the members on their vertical axis. Each of the bearings 10 have a gear formed around their circumference which gears are housed in the annular slots 13 formed in each opening with the exception of one side where the gears pass into the square openings 14. The openings 14 are made to accommodate worm gears 15 which are mounted on shafts 16 the respective ends of which having handles 17. The worms 15 being in constant mesh with the bearings 10.

Mounted adjacent one end of the top plate 4 is a fixed hinge or pivot 18 which extends across the plate so that a plate 19 may be hinged at one end to the top plate and with its opposite end pivoted or hinged as at 20 to each of two threaded standards 21 upon which is mounted the supporting base 22. The opposite end of the base 22 is supported in a like manner by two standards 23 through the medium of a pivoted connection 24. Each of the four standards is received in the members 11 of the bearings 10 and the threads on the standards are made to engage the internal threads on the members 11 so that by turning the handles 17 the base 22 may be raised or lowered. The plate 19 also adds to the rigidity of the structure owing to its width. To rotate the base 22 the entire support is revolved about the pedestal by turning the handles 25 on the ends of the shaft 26 which carries the worm 27 made to mesh with the gear 2. All of the shafts 16 and the shaft 26 are mounted in proper journals as shown. From the above it will be readily seen that the base 22 may be adjusted to a fine degree of accuracy in either a horizontal or vertical plane in a most convenient and practical manner.

It is to be understood that the form of my invention herewith shown and described is to be taken as a preferred example of the same, and that various changes in the shape, size and arrangement of parts may be resorted to without departing from the spirit of the invention or the scope of the supjoined claims.

Having thus described my invention, I claim;—

1. A device of the character described comprising a pedestal, a gear rigidly secured on said pedestal, a support rotatably mounted above said gear, said support comprising plates superimposed one upon the other, annular recesses formed in said plates, orifices formed in said plates concentric with said annular recesses, bearings mounted within said orifices, a gear formed on each of said bearings, said gears being adapted to lie within said annular recesses, internally threaded members mounted within said bearings and adapted to oscillate with respect to the vertical adjustment of said bearings, means for causing said members to rotate with said bearings, threaded standards having engagement with said internally threaded members, a support mounted on said standards, and means for rotating said bearings.

2. A device of the character described comprising a pedestal, a gear rigidly secured on said pedestal, a support rotatably mounted above said gear, said support comprising plates superimposed one upon the other, annular recesses formed in said plates, orifices formed in said plates concentric with said annular recesses, bearings mounted within said orifices, a gear formed on each of said bearings, said gears being adapted to lie within said annular recesses, internally threaded members mounted within said bearings and adapted to oscillate with respect to the vertical adjustment of said bearings, threaded standards having engagement with said internally threaded members, a support mounted on said standards, worm gears mounted adjacent said bearings and in mesh with the gears formed thereon, and a shaft for rotating said worm gears.

3. A device of the character described comprising a pedestal, a gear rigidly secured on said pedestal, a support rotatably mounted above said gear, said support comprising plates superimposed one upon the other, annular recesses formed in said plates, orifices formed in said plates concentric with said annular recesses, bearings mounted within said orifices, a gear formed on each of said bearings, said gears being adapted to lie within said annular recesses, internally threaded members mounted within said bearings and adapted to oscillate with respect to the vertical adjustment of said bearings, threaded standards having engagement with said internally threaded members, a support mounted on said standards, worm gears mounted adjacent said bearings and in mesh with the gears formed thereon, and a worm gear mounted beneath said support and adapted to mesh with said first mentioned gear for the purpose of rotating said support with respect to said pedestal.

In testimony whereof I, affix my signature.

DAVE MAKOWER.